(12) United States Patent
Mödinger et al.

(10) Patent No.: US 6,976,707 B2
(45) Date of Patent: Dec. 20, 2005

(54) DEVICE FOR TENSIONING A SAFETY BELT

(75) Inventors: Thomas Mödinger, Alfdorf (DE); Joachim Biller, Lorch (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 195 days.

(21) Appl. No.: 10/447,056

(22) Filed: May 28, 2003

(65) Prior Publication Data
US 2003/0227166 A1 Dec. 11, 2003

(30) Foreign Application Priority Data
Jun. 6, 2002 (DE) ............................ 202 08 808 U

(51) Int. Cl.$^7$ ............................................. B60R 22/46
(52) U.S. Cl. ...................................................... 280/806
(58) Field of Search .......................... 280/806; 297/480

(56) References Cited

U.S. PATENT DOCUMENTS

| | | | | |
|---|---|---|---|---|
| 3,977,724 A | * | 8/1976 | Pitney ........................ 297/480 |
| 4,385,775 A | * | 5/1983 | Shimogawa et al. ........ 280/806 |
| 4,427,216 A | * | 1/1984 | Kato et al. .................. 280/806 |
| 4,473,242 A | * | 9/1984 | Weman .................... 280/801.1 |
| 4,655,312 A | * | 4/1987 | Frantom et al. ............ 180/268 |
| 4,755,699 A | * | 7/1988 | Schmider .................. 310/68 R |
| 4,932,722 A | * | 6/1990 | Motozawa .................. 297/480 |
| 5,152,552 A | * | 10/1992 | Ikegaya ..................... 280/806 |
| 5,476,287 A | * | 12/1995 | Lichtwardt ............... 280/801.2 |
| 5,522,619 A | * | 6/1996 | Collins ....................... 280/806 |
| 5,558,370 A | | 9/1996 | Behr |
| 5,607,185 A | * | 3/1997 | Isaji et al. .................. 280/806 |
| 5,692,805 A | * | 12/1997 | Nishide et al. ............. 297/472 |
| 5,762,372 A | * | 6/1998 | Koujiya et al. ............. 280/806 |
| 5,765,774 A | | 6/1998 | Maekawa et al. |
| 5,794,876 A | * | 8/1998 | Morizane et al. ........... 242/374 |
| 6,155,727 A | * | 12/2000 | Wier .......................... 297/480 |
| 6,186,549 B1 | * | 2/2001 | Specht et al. ............... 280/806 |
| 6,213,512 B1 | | 4/2001 | Swann et al. |
| 6,299,211 B1 | * | 10/2001 | Wier .......................... 280/806 |
| 6,427,935 B1 | * | 8/2002 | Fujii et al. ................ 242/390.9 |
| 6,682,097 B2 | * | 1/2004 | Krauss et al. ............... 280/806 |
| 6,685,124 B2 | | 2/2004 | Frank |
| 2002/0113425 A1 | | 8/2002 | Betz et al. |
| 2002/0180201 A1 | | 12/2002 | Nye et al. |

FOREIGN PATENT DOCUMENTS

| | | | | |
|---|---|---|---|---|
| DE | 3844130 A1 | * | 7/1990 | ........... B60R 22/46 |
| DE | 4136622 A1 | * | 5/1992 | ........... B60R 22/46 |
| DE | 4302042 A1 | | 7/1994 | |
| DE | 4332205 A1 | | 3/1995 | |
| DE | 19941435 A1 | | 4/2001 | |
| DE | 19961799 A1 | | 7/2001 | |
| DE | 20102758 U1 | | 8/2001 | |
| DE | 10027599 C1 | | 10/2001 | |

* cited by examiner

Primary Examiner—Paul N. Dickson
Assistant Examiner—Laura B. Rosenberg
(74) Attorney, Agent, or Firm—Tarolli, Sundheim, Covell & Tummino L.L.P.

(57) ABSTRACT

A device for tensioning a safety belt includes a motor and a traction transmission device having a first end and a second end. The second end of the traction transmission device is coupled to a belt buckle or an end fitting of the safety belt. The motor is constructed as a tensioner drive for an emergency tensioning. The traction transmission device is coupled to the motor such that a drive movement of the motor is converted into a longitudinal movement of the traction transmission device.

17 Claims, 4 Drawing Sheets

DEVICE FOR TENSIONING A SAFETY BELT

TECHNICAL FIELD

The invention relates to a device for tensioning a safety belt.

BACKGROUND OF THE INVENTION

Conventional belt tensioning devices usually comprise a motor and a traction transmission means, one end of which is coupled to a belt buckle or to an end fitting of the safety belt.

Such a device is known from the DE 199 61 799 A1. An electromotive drive serves, in the case of an imminent accident to the vehicle, to bring a belt buckle from a normal position into a provisional safety position, so that an increased traction is exerted onto the safety belt band. This procedure is generally designated as pre-tensioning and only requires a fraction of the force necessary for the actual tensioning of the belt band. If an impact actually occurs, a separate pyrotechnically actuated tensioner drive takes over the emergency tensioning procedure, in which the belt buckle is moved into a final safety position. Otherwise, the belt buckle is returned into its normal position again by means of a compression spring.

A disadvantage in a pyrotechnically actuated tensioner drive is that it can only be used once. In addition, such a drive only provides the driving energy necessary for the tensioning of the belt band over an extremely short period of time. If, for any reason, the belt band can not be tensioned sufficiently during this period of time, there is no possibility for continuing the tensioning procedure.

The invention provides a device for tensioning a safety belt which can be used several times and provides a constant force for tensioning the belt band over a sufficiently long period of time.

BRIEF SUMMARY OF THE INVENTION

According to the invention, a device for tensioning a safety belt comprises a motor and a traction transmission means having a first end and a second end. The second end of the traction transmission means is coupled to a belt buckle or an end fitting of the safety belt. The motor is constructed as a tensioner drive for an emergency tensioning. The traction transmission is coupled to the motor such that a drive movement of the motor is converted into a longitudinal movement of the traction transmission means. The tensioning function is ensured solely through the drive motor; a separate pyrotechnic tensioner drive is no longer necessary. The invention is based on the knowledge that electric motors are commercially available which are able to reach very high rotation rates under load within a very short time. The belt forces which are able to be realized with this drive concept are in fact lower than in a pyrotechnic tensioner drive; however, in contrast to a pyrotechnical tensioner drive, in which a pneumatic drive pressure is built up very quickly but drops sharply after reaching the maximum, the drive moment of an electromotor is maintained during the entire procedure, so that lower drive forces are sufficient. As long as the motor is supplied with sufficient current, it can maintain the output necessary for tensioning. The risk that the tensioning procedure is possibly prematurely stopped does not exist. After the tensioning has been completed, the drive does not have to be exchanged, because the motor, in contrast to a pyrotechnic charge, is not destroyed.

Preferably, the drive motor is a brushless direct current motor with an internal rotor. In comparison with external rotors, internal rotors in fact generally provide a lower torque, but have a lower moment of inertia. It has been found that this criterion is more important, because only a small moment of inertia renders possible the necessary short response time. In addition, brushless direct current motors permit, at least briefly, very high current loads, so that a relatively high starting moment is able to be realized without difficulty. In connection with the lower moment of inertia, the high starting moment of the direct current motor ensures an extremely rapid run-up to very high rotation rates.

The use of a motor which is operable at various speeds is particularly advantageous. Thus, the motor can take over both the emergency tensioning and also a preceding pre-tensioning, for which no such high rotation rates are necessary.

An additional functionality of the device according to the invention is produced in that the motor is operable in two opposite directions. Apart from the fact that thereby, after tensioning has been completed, the belt buckle or the end fitting of the safety belt can be brought back into the normal position again in a simple manner, in addition a buckle bringer function can be realized. The belt buckle is moved upwards by the motor, in order to facilitate for the vehicle occupant the insertion of the buckle tongue of the safety belt, and is then brought into the prescribed normal position again with the reverse operating direction of the motor.

In a first preferred embodiment of the invention, the conversion of the rotational movement of the motor into a linear movement takes place in that a threaded sleeve having an internal thread is coupled to the motor and a threaded body is provided which has an external thread matching with the internal thread, the first end of the traction transmission means being secured to the threaded body.

In a second preferred embodiment, the motor drives a pinion which engages into a rack on which the first end of the traction transmission means is secured. In order to obtain a suitable transmission for the movement of the rack, preferably a planetary gearing is provided between the drive shaft of the motor and the pinion.

In a third preferred embodiment, the internal rotor of the motor has an internal thread, into which an external thread of a threaded body engages, the first end of the traction transmission means being secured to the threaded body. This makes possible a very compact construction, so that the device according to the invention can also be constructed as a linear tensioner without deflection of the traction means.

DETAILED DESCRIPTION OF THE PREFERRED EMBODIMENTS

Figure 1:
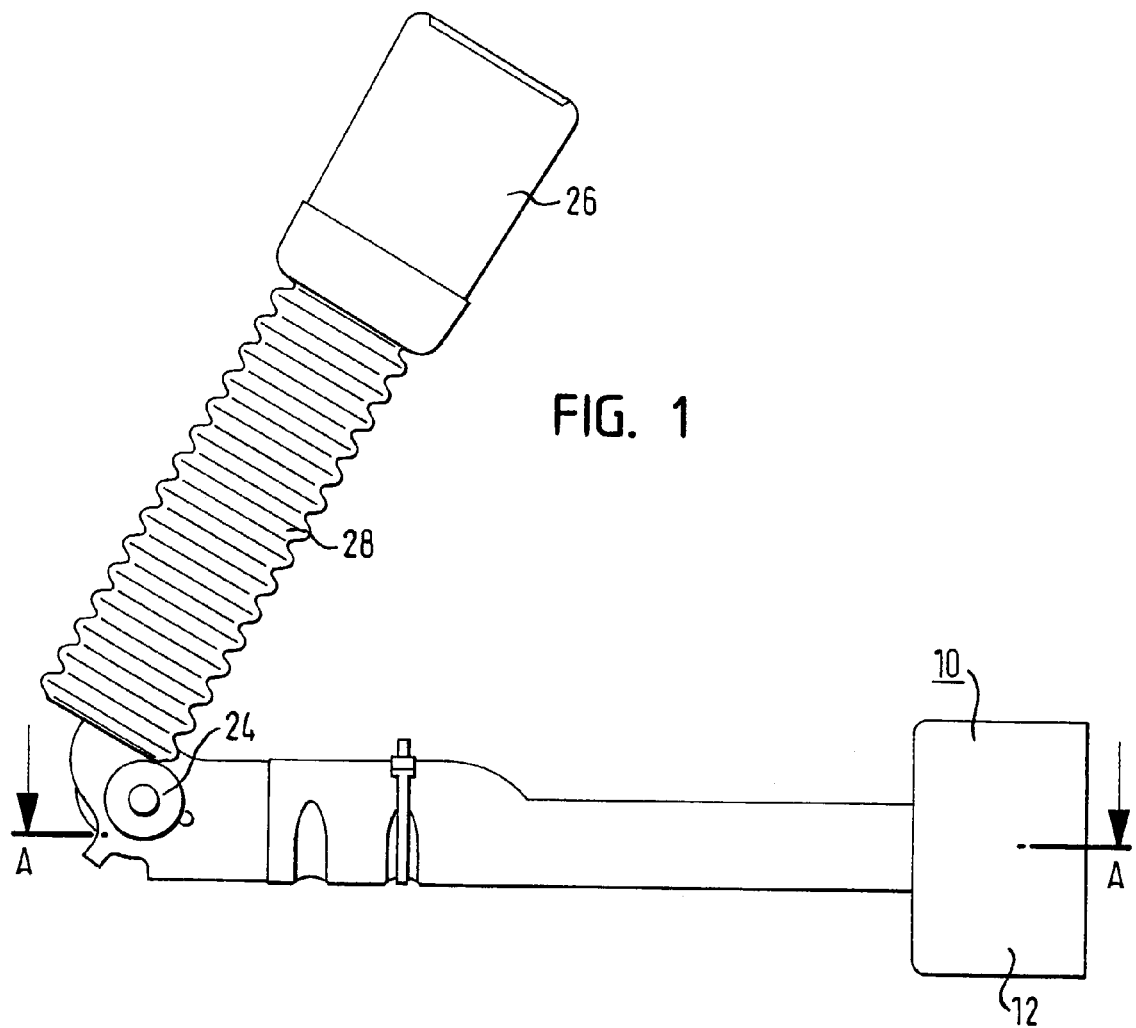
FIG. 1 shows a side view of a tensioning device of the invention according to a first embodiment.
Figure 2:
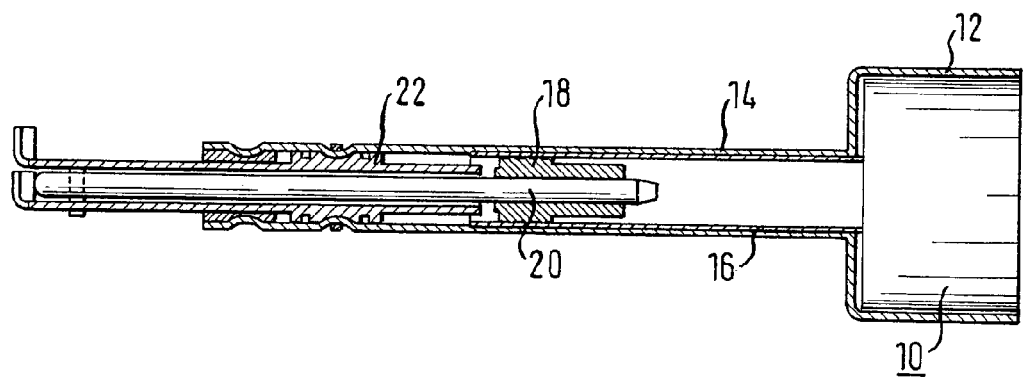
FIG. 2 shows a sectional view of the device of FIG. 1 along line A—A.

In FIGS. 1 and 2 a belt buckle tensioning device is illustrated, which is driven by a motor 10. The motor 10 is accommodated in a housing 12 provided with an elongated cylindrical extension 14. The motor 10 is a direct current motor with a brushless internal rotor, which reaches a starting moment of more than 2 Nm and a run-up to several thousand revolutions per minute within a few milliseconds. Coupled to the motor 10 is an elongated threaded sleeve 16 with an internal thread, which projects into the housing extension 14. Inside the threaded sleeve 16, a threaded body 18 is arranged which has an external thread matching with the internal thread of the sleeve 16. By rotation of the threaded sleeve 16, the threaded body 18 can be moved—depending on the direction of rotation—in axial direction towards the motor 10 and away from the motor 10.

The threaded body 18 has a central axial bore in which a first end of a rigid traction cable 20 is pressed. The traction cable 20 is directed obliquely upwards by several guide elements 22 out from the housing extension 14 and over a deflection device 24. The second end of the traction cable 20 is coupled to a belt buckle 26 (see FIG. 3), the longitudinal direction of which coincides with that of the traction cable section which is directed obliquely upwards. In the region between the deflection device 24 and the belt buckle 26, the traction cable is surrounded by a casing 28 which rests at its ends on the deflection device 24 and the belt buckle 26, respectively. The casing 28 is constructed to be flexible enough that it is able to be compressed in longitudinal direction without appreciable resistance and is able to be drawn apart again.

The rotational movement of the motor 10 is converted via the threaded sleeve 16 and the threaded body 18 into a linear movement of the traction cable 20, which in turn is converted via the deflection device 24 and the coupling to the belt buckle 26 into a longitudinal movement of the belt buckle 26. Thus, the belt buckle 26 can be moved by the motor 10 from its normal position shown in FIG. 1 towards the deflection device 24. The motor 10 is able to provide the drive power necessary for a tensioning procedure in terms of run-up time, starting moment and rotation rate. Compared with a tensioning device which only engages on the shoulder section or only on the lap belt section, an additional facilitation is that through the pulling away of the belt buckle 26 both the shoulder and lap belt sections are tensioned, so that a comparatively short length of path of the belt buckle 26 is long enough for a sufficient tensioning of the entire safety belt. By variation of the thread pitch of the threaded sleeve 16 and of the threaded body 18, the conversion of the rotational movement into a linear movement can be specifically influenced.

After a tensioning procedure, the belt buckle 26 can be brought back into its normal position again, by the motor 10 being driven with the opposite direction of rotation. The device is also suitable for performing a buckle bringer function. Thus, the buckle 26 can be firstly brought into a higher position via the motor drive, in order to facilitate the insertion of the buckle tongue of the safety belt. Then the buckle 26 is moved again into its lower normal position for the driving operation of the vehicle, from which it can be drawn away downwards for a tensioning procedure.

Figure 3:
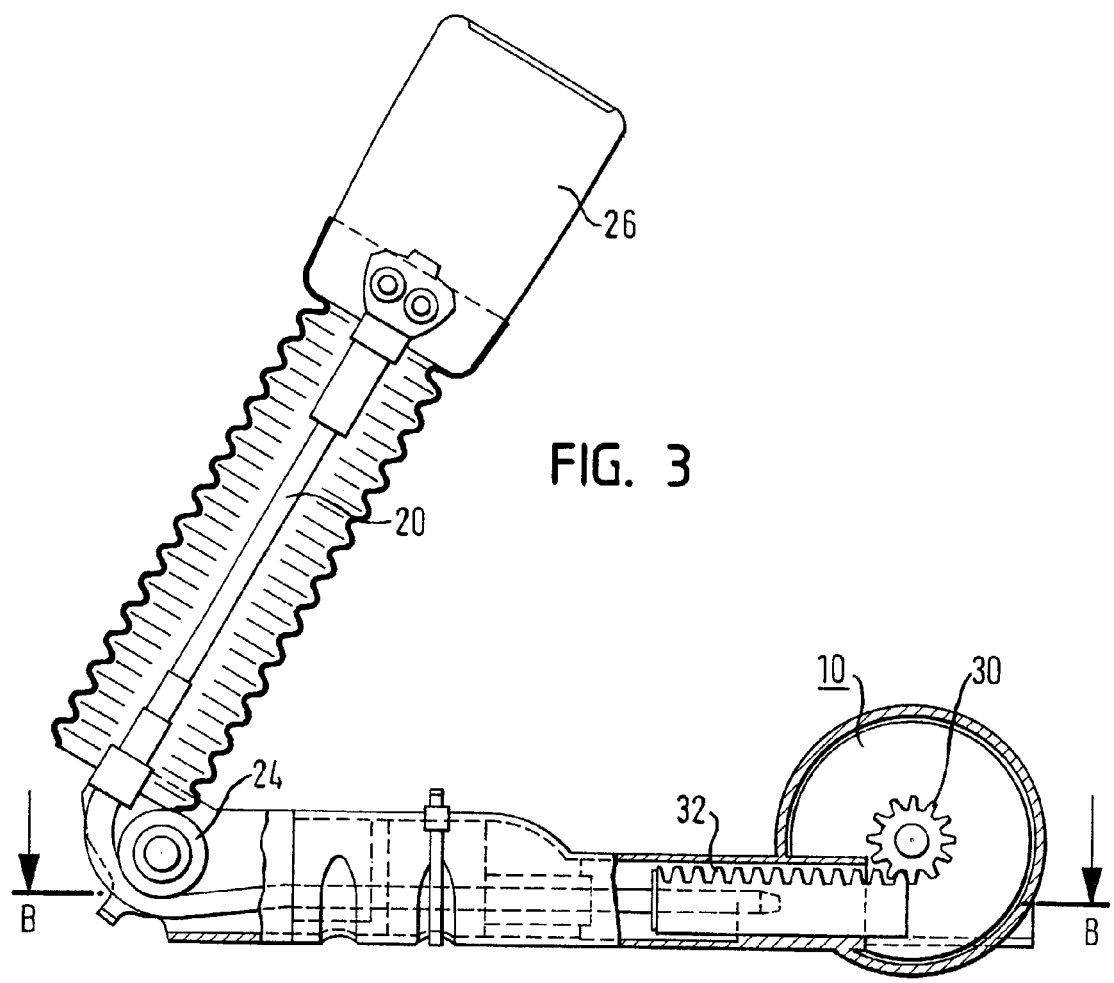
FIG. 3 shows a side view in section of a variant of the first embodiment.
Figure 4:
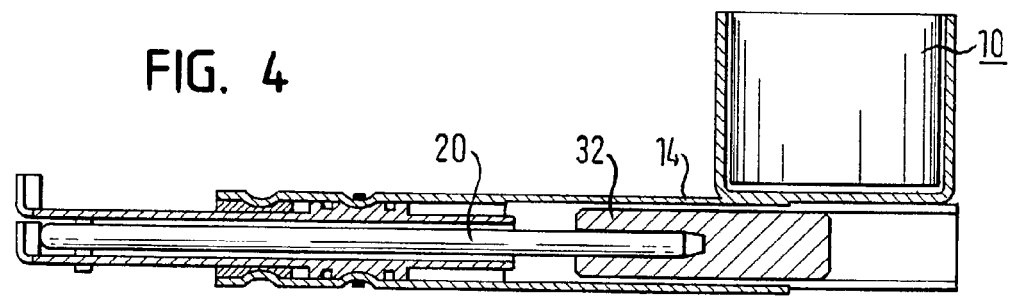
FIG. 4 shows a sectional view of the device of FIG. 3 along line B—B.
Figure 5:
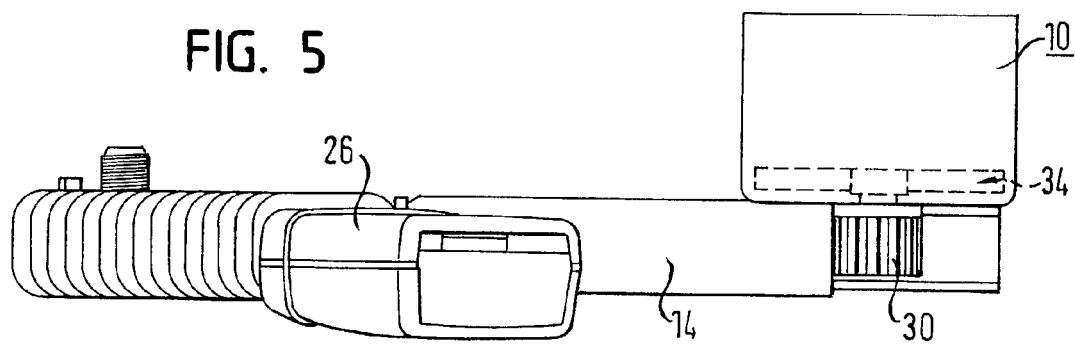
FIG. 5 shows a top view of the device of FIG. 3.

The variant of the belt buckle tensioner device illustrated in FIGS. 3 to 5 differs from the embodiment previously described through the arrangement of the motor 10 and the conversion of the rotational movement of the motor 10 into a linear movement of the traction cable 20. The motor 10 is arranged transversely to the housing extension 14 and carries a pinion 30 on its drive shaft. The pinion 30 projects through an opening into the housing extension 14 and is in engagement with a rack 32 which is held so as to be longitudinally displaceable in the housing extension. Like the threaded body in the previous embodiment, the rack 32 has a central axial bore in which the traction cable 20 is pressed. Between the drive shaft of the motor 10 and the pinion 30, a planetary gearing 34 is arranged, which provides for a suitable transmission for the movement of the rack 32.

Figure 6:
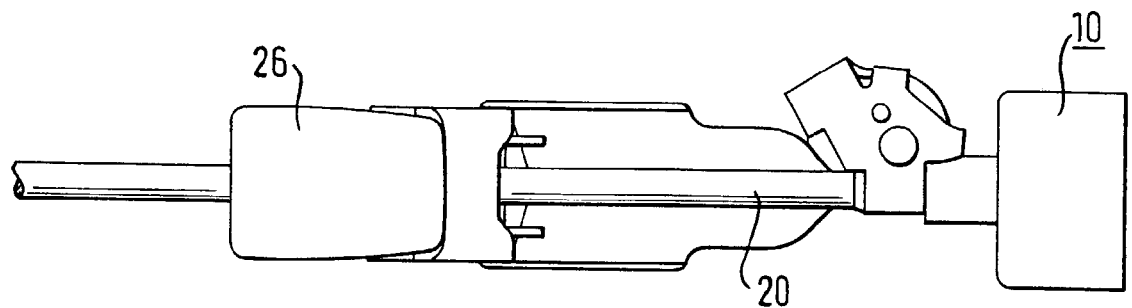
FIG. 6 shows a side view of a tensioning device of the invention according to a second embodiment.
Figure 7:
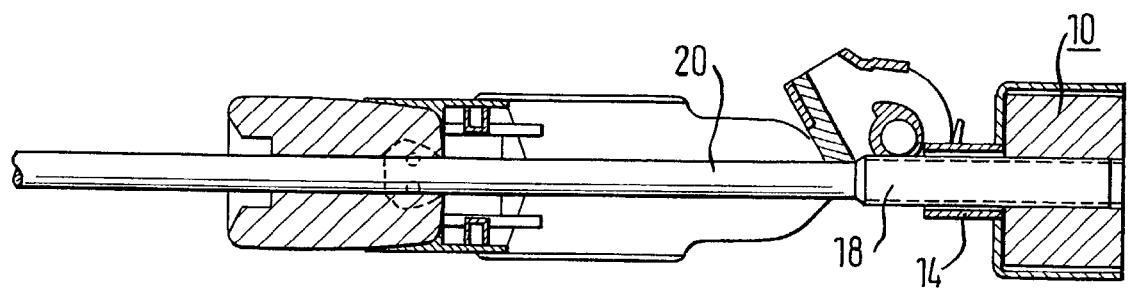
FIG. 7 shows a sectional view of the device of FIG. 6.

The device shown in FIGS. 6 and 7 is, again, a belt buckle tensioning device, but with a linear construction. A device for deflecting the traction cable 20 is not provided. The rotor of the motor 10 in the embodiment shown is provided with an internal thread, into which the external thread of the threaded body 18 engages, which in turn is connected with an end section of the traction cable. Alternatively to the internal thread on the rotor, the drive can also take place, as in the embodiment of FIGS. 1 and 2, by means of a threaded sleeve or as in the embodiment of FIGS. 3 to 5 by means of a pinion and a rack.

Figure 8:
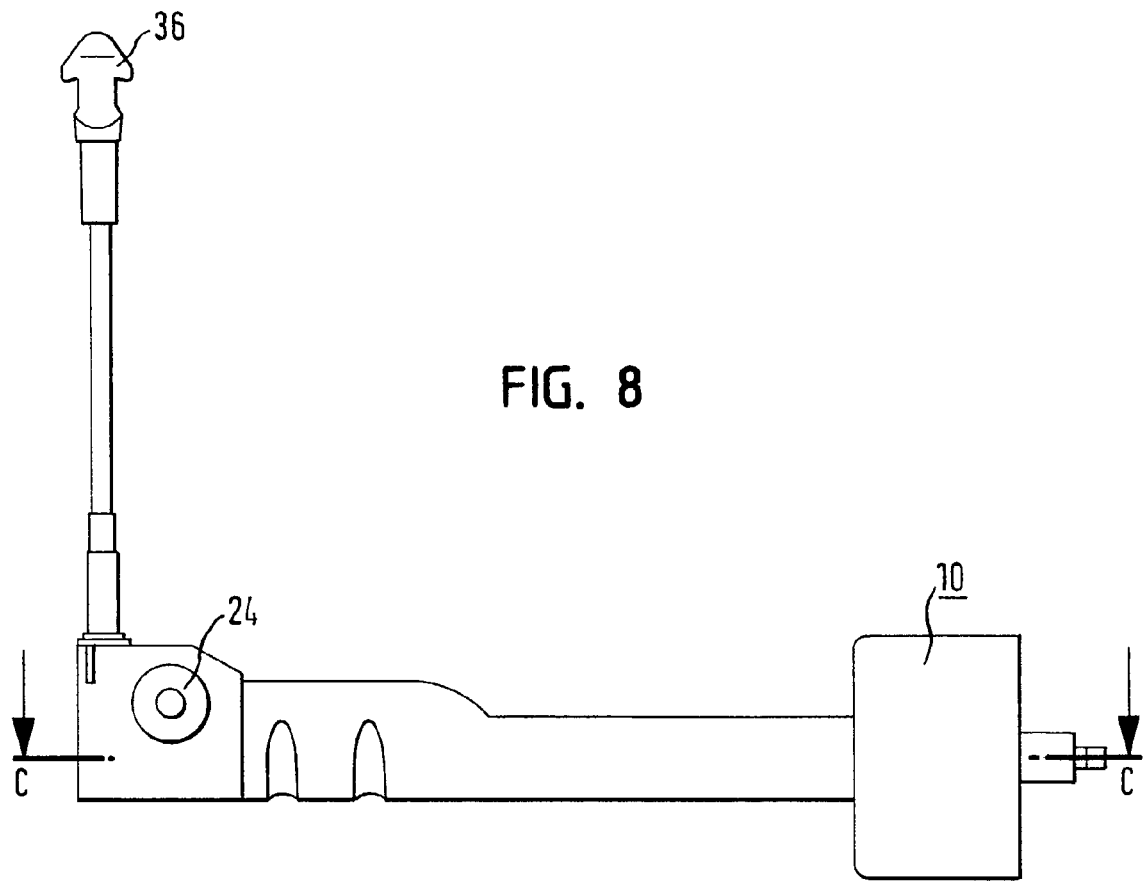
FIG. 8 shows a side view of a tensioning device of the invention according to a third embodiment.
Figure 9:
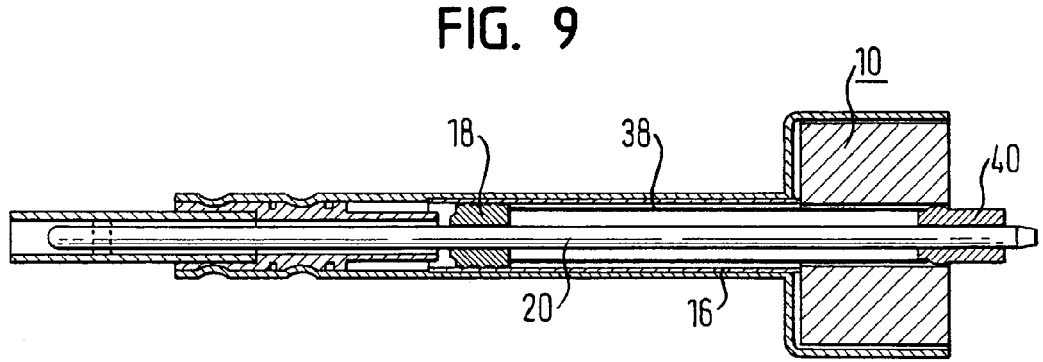
FIG. 9 shows a sectional view of the device of FIG. 8 along line C—C.

The construction of the tensioning device shown in FIGS. 8 and 9 corresponds substantially to that of the embodiment of FIGS. 1 and 2. However, the device is not constructed as a belt buckle tensioner, but rather as an end fitting tensioner, i.e. the second end of the traction cable 20 is coupled to an end fitting 36 of the safety belt, which is usually arranged in the region of the B-column of the vehicle. In addition, a deformation tube 38, supported by one end on the threaded body 18 and projecting by the other free end into the interior of the motor, and a substantially cylindrical deformation body 40 form a force limiting device. The deformation body 40 is pressed onto the first end of the traction cable 20 extending through the deformation tube 38, and is provided with a thickening which engages on the end of the deformation tube 38 on the motor side.

After a tensioning procedure, in which the threaded body 18 with the traction cable 20 and the deformation tube 38 has moved towards the motor, the cable 20 experiences in the subsequent case of restraint a traction in the opposite direction as a result of the kinetic energy of the vehicle occupant. In this phase, the motor 10 is locked, so that the threaded body 18 and the deformation tube 38 assume a fixed position. The deformation body 40, owing to the traction exerted on the cable 20, penetrates into the deformation tube 38 under plastic deformation of the latter. The penetration of the deformation body 40 renders possible the yielding of the traction cable 20 and hence an effective force limitation of the restraining force on the vehicle occupant.

What is claimed is:

1. A device for tensioning a safety belt, said device comprising a motor and a traction transmission device having a first end and a second end, said second end of said traction transmission device being coupled to one of a belt buckle and an end fitting of said safety belt, said motor being constructed as a tensioner drive to perform an emergency tensioning of said safety belt, said traction transmission device being coupled to said motor such that a drive movement of said motor is converted into a longitudinal movement of said traction transmission device.

2. The device according to claim 1, wherein said motor is a brushless direct current motor having an internal rotor.

3. The device according to claim 1, wherein said motor is operable at various speeds.

4. The device according to claim 1, wherein said motor is operable in two opposite directions.

5. The device according to claim 1, wherein said motor drives a pinion which engages into a rack to which said first end of said traction transmission device is secured.

6. The device according to claim 5, wherein a planetary gearing is provided between said motor and said pinion.

7. The device according to claim 1, wherein said motor performs both the emergency tensioning and a pre-tensioning of said safety belt.

8. A device for tensioning a safety belt, said device comprising a motor and a traction transmission device having a first end and a second end, said second end of said traction transmission device being coupled to one of a belt buckle and an end fitting of said safety belt, said motor being constructed as a tensioner drive for an emergency tensioning, said traction transmission device being coupled to said motor such that a drive movement of said motor is converted into a longitudinal movement of said traction transmission device, wherein a threaded sleeve having an internal thread is coupled to said motor and a threaded body is provided which has an external thread matching with said internal thread, said first end of said traction transmission device being secured to said threaded body.

9. The device according to claim 8, wherein a deformation tube is supported by said threaded body, a deformation body being provided which is connected with said traction transmission device and adapted to penetrate said deformation tube with plastic deformation of said deformation tube.

10. A device for tensioning a safety belt, said device comprising a motor and a traction transmission device having a first end and a second end, said second end of said traction transmission device being coupled to one of a belt buckle and an end fitting of said safety belt, said motor being constructed as a tensioner drive for an emergency tensioning, said traction transmission device being coupled to said motor such that a drive movement of said motor is converted into a longitudinal movement of said traction transmission device, wherein said motor is a brushless direct current motor having an internal rotor, said internal rotor of said motor has an internal thread into which an external thread of a threaded body engages, said first end of said traction transmission device being secured to said threaded body.

11. The device according to claim 10, wherein a deformation tube is supported by said threaded body, a deformation body being provided which is connected with said traction transmission means and adapted to penetrate said deformation tube with plastic deformation of said deformation tube.

12. A device for tensioning a safety belt, said device comprising a motor and a traction transmission device having a first end and a second end, said second end of said traction transmission device being coupled to one of a belt buckle and an end fitting of said safety belt, said motor being constructed as a tensioner drive to perform an emergency tensioning of said safety belt, said emergency tensioning occurring after pre-tensioning of the safety belt and during a vehicle impact to supply high force to a vehicle occupant during the impact, said traction transmission device being coupled to said motor such that a drive movement of said motor is converted into a longitudinal movement of said traction transmission device.

13. The device according to claim 12, wherein said motor is a brushless direct current motor having an internal rotor.

14. The device according to claim 12, wherein said motor is operable at various speeds.

15. The device according to claim 12, wherein said motor is operable in two opposite directions.

16. The device according to claim 12, wherein said motor drives a pinion which engages into a rack to which said first end of said traction transmission device is secured.

17. The device according to claim 16, wherein a planetary gearing is provided between said motor and said pinion.

\* \* \* \* \*